US011252692B2

(12) United States Patent
Son et al.

(10) Patent No.: US 11,252,692 B2
(45) Date of Patent: Feb. 15, 2022

(54) ELECTRONIC DEVICE FOR IMPROVING POSITION MEASUREMENT PERFORMANCE AND OPERATION METHOD OF ELECTRONIC DEVICE

(71) Applicant: SAMSUNG ELECTRONICS CO., LTD., Suwon-si (KR)

(72) Inventors: Hyeonchang Son, Suwon-si (KR); Hyungpil Kum, Suwon-si (KR); Kihong Min, Suwon-si (KR); Donghwan Seo, Suwon-si (KR); Kihyuk Lee, Suwon-si (KR); Jeongmin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/852,903

(22) Filed: Apr. 20, 2020

(65) Prior Publication Data

US 2021/0029662 A1    Jan. 28, 2021

(30) Foreign Application Priority Data

Jul. 24, 2019   (KR) .................. 10-2019-0089409

(51) Int. Cl.
  *H04W 64/00*   (2009.01)
  *H04W 4/80*    (2018.01)
  (Continued)

(52) U.S. Cl.
  CPC .......... *H04W 64/003* (2013.01); *G01S 19/14* (2013.01); *H04W 4/029* (2018.02); *H04W 4/80* (2018.02);
  (Continued)

(58) Field of Classification Search
  CPC ..... H04W 64/003; H04W 4/80; H04W 88/06; H04W 4/029; H04W 76/14; H04W 24/10; G01S 19/14; G01S 19/35; G01S 19/21
  (Continued)

(56) References Cited

U.S. PATENT DOCUMENTS 7,039,419 B2    5/2006  Ono
10,135,484 B2  11/2018  Jain et al.
(Continued)

FOREIGN PATENT DOCUMENTS

CN       109495943        3/2019
KR    10-2014-0051383     4/2014
KR       10-1642213       7/2016

OTHER PUBLICATIONS

International Search Report and Written Opinion dated Aug. 28, 2020 in corresponding International Application No. PCT/KR2020/005160.

*Primary Examiner* — Inder P Mehra
(74) *Attorney, Agent, or Firm* — Nixon & Vanderhye P.C.

(57) ABSTRACT

Various embodiments relate to an electronic device and an operation method of an electronic device, and the electronic device may include: a GNSS circuit module comprising GNSS circuitry configured to receive a signal for measuring a position of the electronic device; a first mmWave communication module comprising communication circuitry disposed adjacent to the GNSS circuit module and configured to perform a first cellular communication; and a processor, wherein the processor may be configured to receive, from the GNSS circuit module, a signal indicating a start of position measurement of the electronic device based on the first mmWave communication module being activated, to determine whether to deactivate the first mmWave communication module based on a characteristic of an application activated on the processor, and to control the first mmWave
(Continued)

communication module based on the determination of whether to deactivate the first mmWave communication module.

20 Claims, 10 Drawing Sheets

(51) Int. Cl.

| | |
|---|---|
| *H04W 88/06* | (2009.01) |
| *H04W 4/029* | (2018.01) |
| *H04W 76/14* | (2018.01) |
| *H04W 24/10* | (2009.01) |
| *G01S 19/14* | (2010.01) |
| *G01S 19/35* | (2010.01) |
| *G01S 19/21* | (2010.01) |

(52) U.S. Cl.
CPC ........... *H04W 24/10* (2013.01); *H04W 76/14* (2018.02); *H04W 88/06* (2013.01)

(58) Field of Classification Search
USPC ........................................................ 455/456.1
See application file for complete search history.

(56) References Cited

U.S. PATENT DOCUMENTS

| | | | |
|---|---|---|---|
| 2003/0045333 | A1 | 3/2003 | Kimata et al. |
| 2012/0207040 | A1 | 8/2012 | Comsa et al. |
| 2013/0028201 | A1 | 1/2013 | Koo et al. |
| 2013/0231113 | A1 | 9/2013 | Prise |
| 2013/0337834 | A1 | 12/2013 | Alpert et al. |
| 2017/0105216 | A1 | 4/2017 | Jung et al. |
| 2017/0295502 | A1* | 10/2017 | Stirling-Gallacher ...................... H04B 7/024 |
| 2019/0123864 | A1* | 4/2019 | Zhang .................... H04B 7/024 |
| 2019/0379119 | A1* | 12/2019 | He ......................... H01Q 21/28 |
| 2020/0037304 | A1* | 1/2020 | Khojastepour ....... H04W 4/029 |
| 2020/0128597 | A1* | 4/2020 | Shimizu ................. H04W 16/28 |
| 2021/0135716 | A1* | 5/2021 | Kuo ..................... H04B 7/0639 |

* cited by examiner

ELECTRONIC DEVICE FOR IMPROVING POSITION MEASUREMENT PERFORMANCE AND OPERATION METHOD OF ELECTRONIC DEVICE

CROSS-REFERENCE TO RELATED APPLICATION

This application is based on and claims priority under 35 U.S.C. § 119 to Korean Patent Application No. 10-2019-0089409, filed on Jul. 24, 2019, in the Korean Intellectual Property Office, the disclosure of which is incorporated by reference herein in its entirety.

BACKGROUND

Field

The disclosure relates to an electronic device and an operation method of an electronic device and, for example, to a technology for improving a position measurement performance of an electronic device.

Description of Related Art

Various electronic devices, such as a smart phone, a tablet PC, a portable multimedia player (PMP), a personal digital assistant (PDA), a laptop personal computer (PC), and a wearable device, have become widespread.

To meet the demand for wireless data traffic having increased since deployment of 4G communication systems, efforts have been made to develop an improved 5G or pre-5G communication system. Therefore, the 50 or pre-5G communication system is also called a "Beyond 4G Network" or a "Post LTE System". The 50 communication system is considered to be implemented in higher frequency (mmWave) bands (e.g., 30 GHz to 60 GHz bands), so as to accomplish higher data rates.

A signal having an extremely high frequency band has a high straightness due to a characteristic of the extremely high frequency band. A communication system using a signal having a high straightness has a narrower coverage than a communication system using a signal having a relatively low straightness. Considering the narrow coverage, an electronic device may include a plurality of communication modules for emitting signals in various directions.

A communication module for emitting a signal above an electronic device may be disposed at an upper end portion of the electronic device, and may incur noise which affects other components (for example, a global navigation satellite system (GNSS) circuit module) disposed at the upper end portion of the electronic device.

The noise incurred by the communication module may cause the performance degradation of other components, and the performance degradation of a GNSS circuit module may cause the performance degradation of position measurement of the electronic device.

The above information is presented as background information only to assist with an understanding of the disclosure. No determination has been made, and no assertion is made, as to whether any of the above might be applicable as prior art with regard to the disclosure.

SUMMARY

Embodiments of the disclosure provide an electronic device and an operation method of an electronic device that prevent and/or reduce the occurrence of noise by a mmWave communication module, thereby improving a position measurement performance of an electronic device.

An electronic device according to various example embodiments may include: a GNSS circuit module comprising GNSS circuitry configured to receive a signal for measuring a position of the electronic device; a first mmWave communication module comprising communication circuitry disposed adjacent to the GNSS circuit module and configured to perform a first cellular communication; and a processor, wherein the processor may be configured to receive, from the GNSS circuit module, a signal indicating a start of position measurement of the electronic device based on the first mmWave communication module being activated, to determine whether to deactivate the first mmWave communication module, based on a characteristic of an application activated on the processor, and to control the first mmWave communication module, based on determining whether to deactivate the first mmWave communication module.

An operation method of an electronic device according to various example embodiments may include: receiving, from a GNSS circuit module configured to receive a signal for measuring a position of the electronic device, a signal indicating a start of position measurement of the electronic device based on a first mmWave communication module, which is disposed adjacent to the GNSS circuit module and is configured to perform a first cellular communication, being activated; determining whether to deactivate the first mmWave communication module, based on an operational characteristic of an application activated on a processor; and controlling the first mmWave communication module, based on determining whether to deactivate the first mmWave communication module.

An electronic device and an operation method of an electronic device according to various example embodiments may determine whether to deactivate a first mmWave communication module, based on a characteristic of an activated application, and may deactivate the first mmWave communication module. As the first mmWave communication module is deactivated, noise incurred by an operation of the first mmWave communication module may decrease.

An electronic device and an operation method of an electronic device according to various example embodiments prevent and/or reduce the occurrence of noise by a first mmWave communication module, thereby improving a position measurement performance of an electronic device.

BRIEF DESCRIPTION OF THE DRAWINGS

The above and other aspects, features and advantages of certain embodiments of the present disclosure will be more apparent from the following detailed description taken in conjunction with the accompanying drawings, in which.

DETAILED DESCRIPTION

Figure 1:
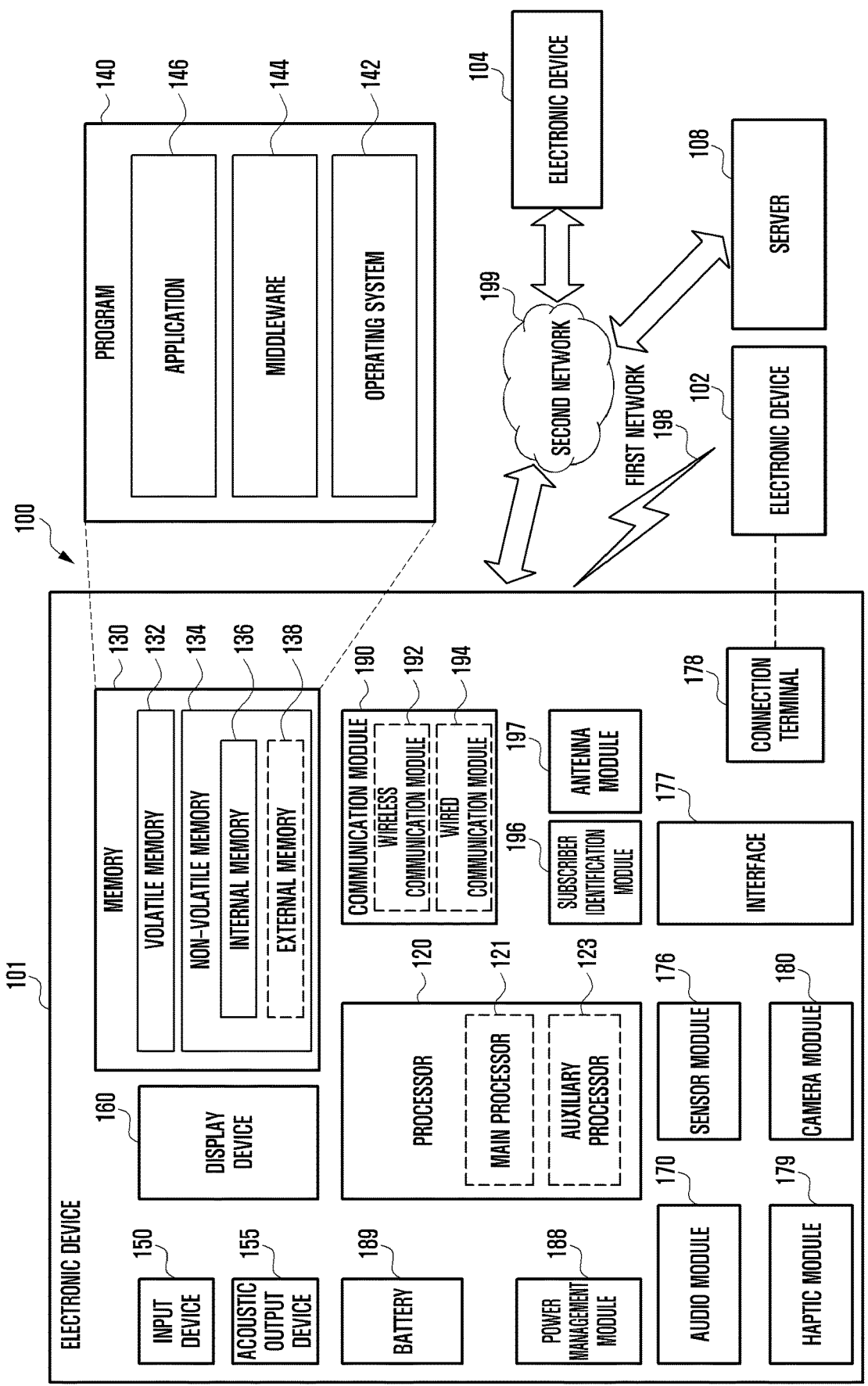
FIG. 1 is a block diagram of illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit and/or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
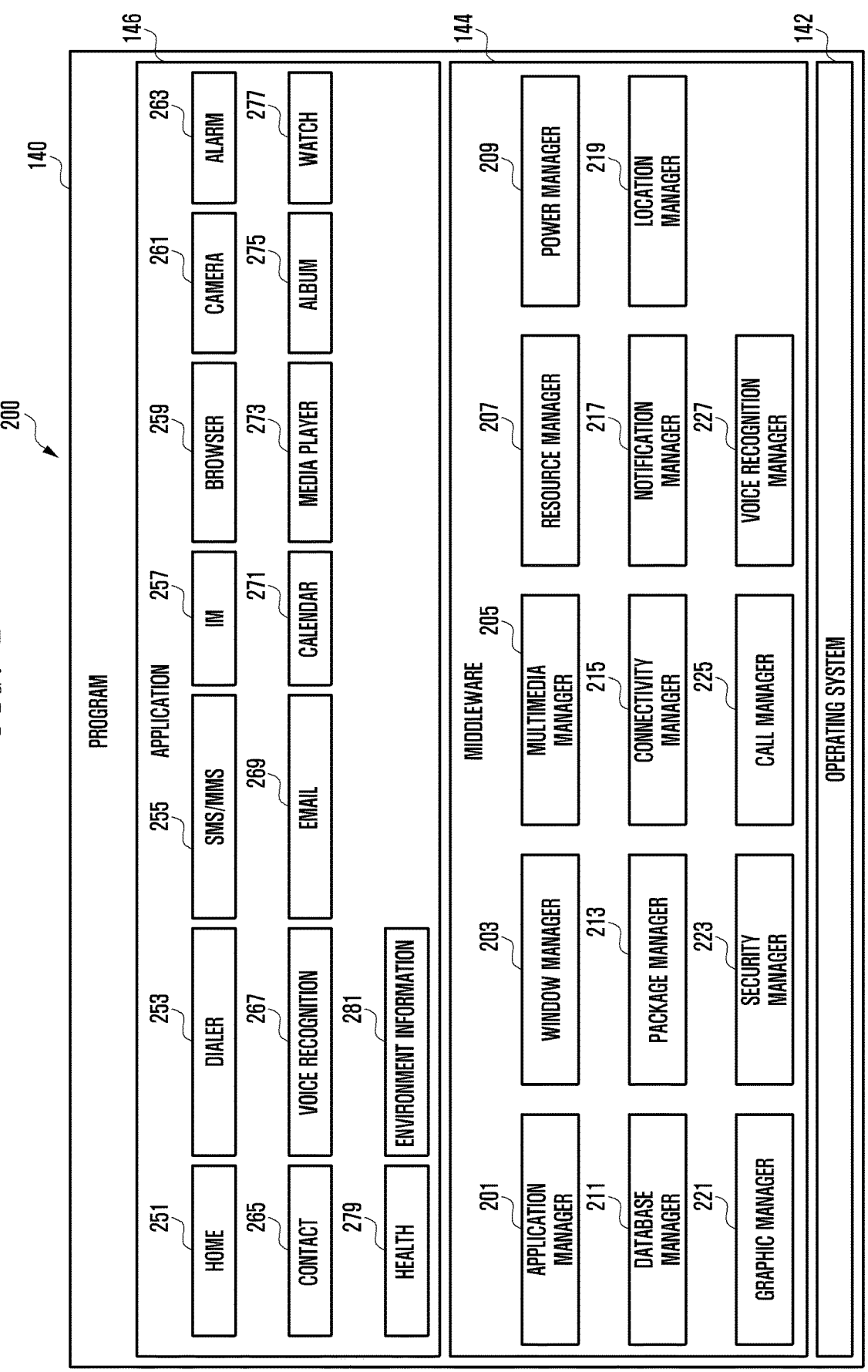
FIG. 2 is a block diagram illustrating an example program according to various embodiments.

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bath'. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
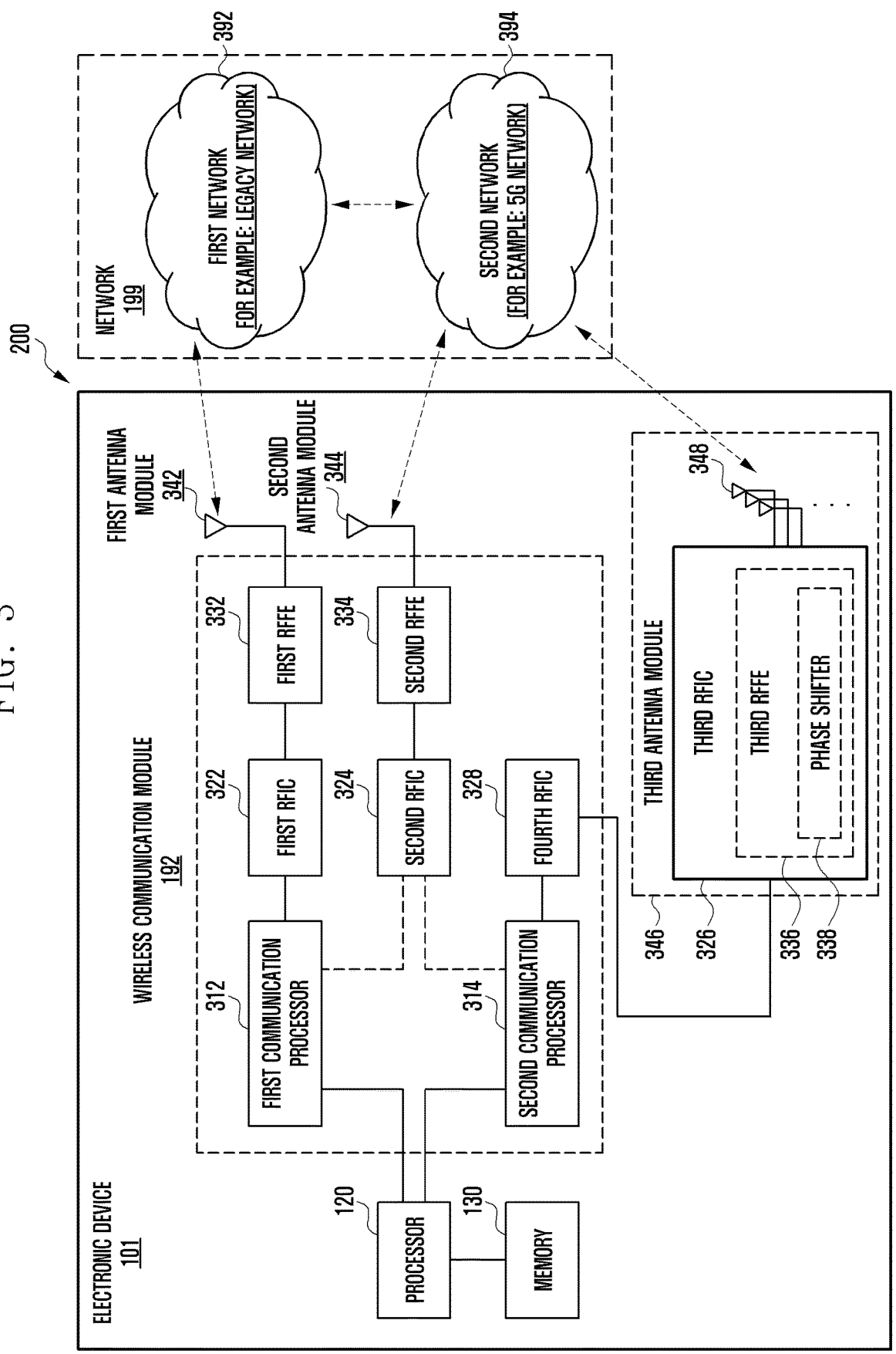
FIG. 3 is a block diagram illustrating an example electronic device, the electronic device supporting a legacy network communication and a 5G network communication according to various embodiments.

FIG. 3 is a block diagram illustrating an example electronic device in a network environment including a plurality of cellular networks according to an embodiment of the disclosure.

Referring to FIG. 3, the electronic device 101 may include a first communication processor 312, second communication processor 314, first RFIC 322, second RFIC 324, third RFIC 326, fourth RFIC 328, first radio frequency front end (RFFE) 332, second RFFE 334, first antenna module 342, second antenna module 344, and antenna 348. The electronic device 101 may include a processor 120 and a memory 130. A second network 199 may include a first cellular network 392 and a second cellular network 394. According to another embodiment, the electronic device 101 may further include at least one of the components described with reference to FIG. 1, and the second network 199 may further include at least one other network. According to an example embodiment, the first communication processor 312, second communication processor 314, first RFIC 322, second RFIC 324, fourth RFIC 328, first RFFE 332, and second RFFE 334 may form at least part of the wireless communication module 192. According to another embodiment, the fourth RFIC 328 may be omitted or included as part of the third RFIC 326.

The first communication processor 312 may establish a communication channel of a band to be used for wireless communication with the first cellular network 392 and support legacy network communication through the established communication channel. According to various embodiments, the first cellular network may be a legacy network including a second generation (2G), 3G, 4G, or long term evolution (LTE) network. The second communication processor 314 may establish a communication channel corresponding to a designated band (e.g., about 6 GHz to about 60 GHz) of bands to be used for wireless communication with the second cellular network 394, and support fifth generation (5G) network communication through the established communication channel. According to various embodiments, the second cellular network 394 may be a 5G network defined in 3rd generation partnership project (3GPP). Additionally, according to an embodiment, the first communication processor 312 or the second communication processor 314 may establish a communication channel corresponding to another designated band (e.g., about 6 GHz or less) of bands to be used for wireless communication with the second cellular network 394 and support 5G network communication through the established communication channel. According to an example embodiment, the first communication processor 312 and the second communication processor 314 may be implemented in a single chip or a single package. According to various embodiments, the first communication processor 312 or the second communication processor 314 may be formed in a single chip or a single package with the processor 120, the auxiliary processor 123, or the communication module 190.

Upon transmission, the first RFIC 322 may convert a baseband signal generated by the first communication processor 312 to a radio frequency (RF) signal of about 700 MHz to about 3 GHz used in the first cellular network 392 (e.g., legacy network). Upon reception, an RF signal may be obtained from the first cellular network 392 (e.g., legacy network) through an antenna (e.g., the first antenna module 342) and be preprocessed through an RFFE (e.g., the first RFFE 332). The first RFIC 322 may convert the preprocessed RF signal to a baseband signal so as to be processed by the first communication processor 312.

Upon transmission, the second RFIC 324 may convert a baseband signal generated by the first communication processor 312 or the second communication processor 314 to an RF signal (hereinafter, 5G Sub6 RF signal) of a Sub6 band (e.g., 6 GHz or less) to be used in the second cellular network 394 (e.g., 5G network). Upon reception, a 5G Sub6 RF signal may be obtained from the second cellular network 394 (e.g., 5G network) through an antenna (e.g., the second antenna module 344) and be pretreated through an RFFE (e.g., the second RFFE 334). The second RFIC 334 may convert the preprocessed 5G Sub6 RF signal to a baseband signal so as to be processed by a corresponding communication processor of the first communication processor 312 or the second communication processor 314.

The third RFIC 326 may convert a baseband signal generated by the second communication processor 314 to an RF signal (hereinafter, 5G Above6 RF signal) of a 5G Above6 band (e.g., about 6 GHz to about 60 GHz) to be used in the second cellular network 394 (e.g., 5G network). Upon reception, a 5G Above6 RF signal may be obtained from the second cellular network 394 (e.g., 5G network) through an antenna (e.g., the antenna 348) and be preprocessed through the third RFFE 336. The third RFIC 326 may convert the preprocessed 5G Above6 RF signal to a baseband signal so as to be processed by the second communication processor 314. According to an example embodiment, the third RFFE 336 may be formed as part of the third RFIC 326.

According to an embodiment, the electronic device 101 may include a fourth RFIC 328 separately from the third RFIC 326 or as at least part of the third RFIC 326. In this case, the fourth RFIC 328 may convert a baseband signal generated by the second communication processor 314 to an RF signal (hereinafter, an intermediate frequency (IF) signal) of an intermediate frequency band (e.g., about 9 GHz to about 11 GHz) and transfer the IF signal to the third RFIC 326. The third RFIC 326 may convert the IF signal to a 5G Above 6RF signal. Upon reception, the 5G Above 6RF signal may be received from the second cellular network 394 (e.g., a 5G network) through an antenna (e.g., the antenna 348) and be converted to an IF signal by the third RFIC 326. The fourth RFIC 328 may convert an IF signal to a baseband signal so as to be processed by the second communication processor 314.

According to an example embodiment, the first RFIC 322 and the second RFIC 324 may be implemented into at least part of a single package or a single chip. According to an example embodiment, the first RFFE 332 and the second RFFE 334 may be implemented into at least part of a single package or a single chip. According to an example embodiment, at least one of the first antenna module 342 or the second antenna module 344 may be omitted or may be combined with another antenna module to process RF signals of a corresponding plurality of bands.

According to an example embodiment, the third RFIC 26 and the antenna 348 may be disposed at the same substrate to form a third antenna module 346. For example, the wireless communication module 192 or the processor 120 may be disposed at a first substrate (e.g., main PCB). In this case, the third RFIC 326 is disposed in a partial area (e.g., lower surface) of the first substrate and a separate second substrate (e.g., sub PCB), and the antenna 348 is disposed in another partial area (e.g., upper surface) thereof; thus, the third antenna module 346 may be formed. By disposing the third RFIC 326 and the antenna 348 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 394 (e.g., 5G network).

According to an example embodiment, the antenna 348 may be formed in an antenna array including a plurality of antenna elements that may be used for beamforming. In this case, the third RFIC 326 may include a plurality of phase shifters 338 corresponding to a plurality of antenna elements, for example, as part of the third RFFE 336. Upon transmission, each of the plurality of phase shifters 338 may convert a phase of a 5G Above6 RF signal to be transmitted to the outside (e.g., a base station of a 5G network) of the electronic device 101 through a corresponding antenna element. Upon reception, each of the plurality of phase shifters 338 may convert a phase of the 5G Above6 RF signal received from the outside to the same phase or substantially the same phase through a corresponding antenna element. This enables transmission or reception through beamforming between the electronic device 101 and the outside.

The second cellular network 394 (e.g., 5G network) may operate (e.g., stand-alone (SA)) independently of the first cellular network 392 (e.g., legacy network) or may be operated (e.g., non-stand alone (NSA)) in connection with the first cellular network 392. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 312, or the second communication processor 314).

Figure 4A:
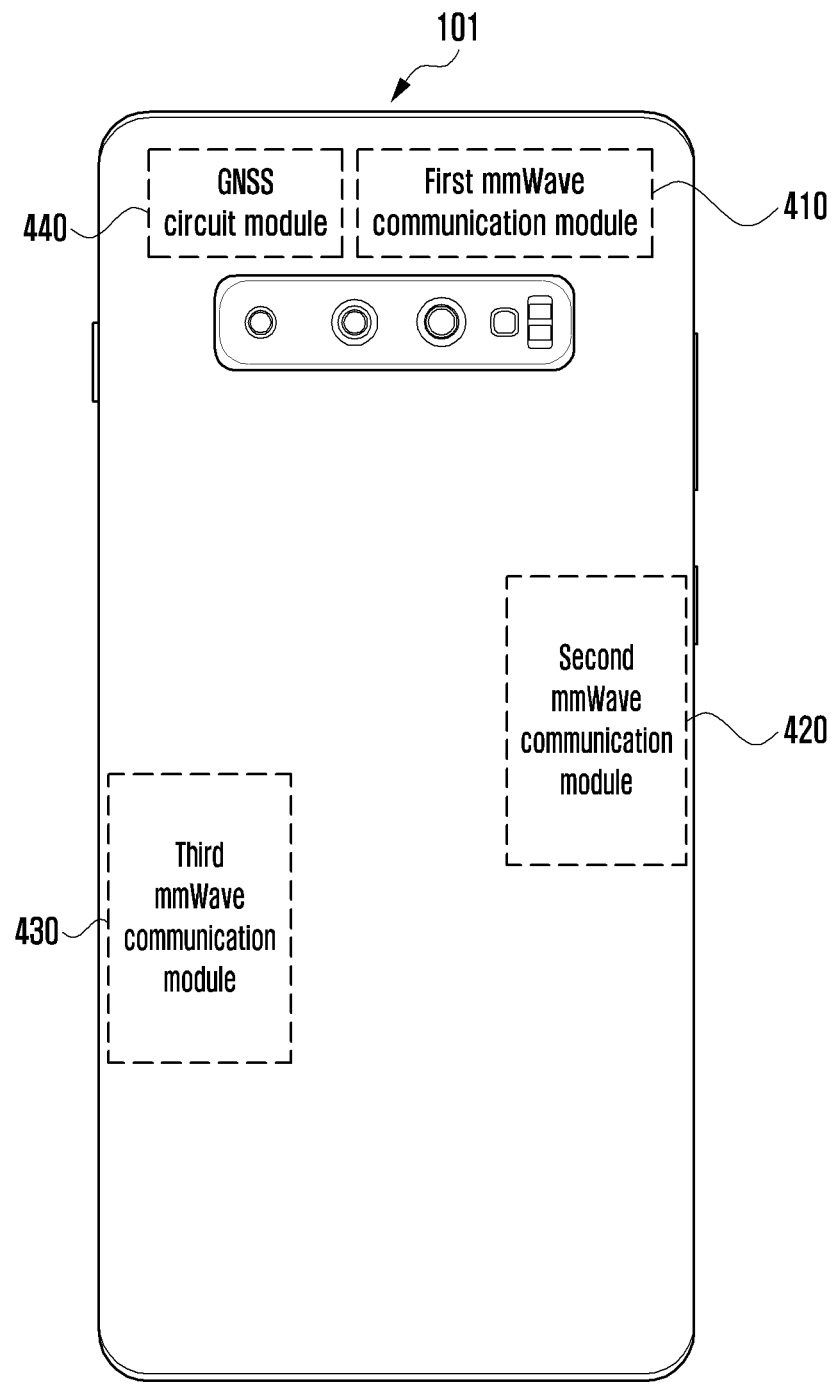
FIG. 4A is a diagram illustrating an example in which a mmWave communication module and a GNSS circuit module are disposed in an electronic device according to various embodiments.

FIG. 4A is a diagram illustrating an example in which a mmWave communication module and a GNSS circuit module are disposed in an electronic device according to various embodiments.

Referring to FIG. 4A, an electronic device (for example, the electronic device 101 of FIG. 1) according to various embodiments may include a plurality of mmWave communication modules including a first mmWave communication module (for example, the third antenna module 346 of FIG. 3) 410 (e.g., including communication circuitry), a second mmWave communication module (for example, the third antenna module 346 of FIG. 3) 420 (e.g., including communication circuitry), and a third mmWave communication module (for example, the third antenna module 346 of FIG. 3) 430 (e.g., including communication circuitry).

According to various embodiments, the plurality of mmWave communication modules may include various communication circuitry and transmit and/or receive a signal via a first cellular communication. The first cellular communication may indicate a communication method among various cellular communication methods that the electronic device 101 can support. For example, the first cellular communication may indicate a communication method (for example, the second network 394 of FIG. 3) among various communication methods which are defined as a fifth generation mobile communication method (for example, 5G).

According to various embodiments, in order to support a first cellular communication, a plurality of mmWave communication modules may transmit and/or receive a signal having a frequency band of 30 to 300 GHz having a wavelength in a unit of mm. A signal that the plurality of mmWave communication modules transmit and/or receive may have a high straightness in accordance with a characteristic of an extremely high frequency band. Due to a characteristic of a signal having a high straightness, a single mmWave communication module (for example, the first mmWave communication module 410, the second mmWave communication module 420, or the third mmWave communication module 430) may implement a coverage narrower than a coverage implemented by a communication module using a signal having a relatively low frequency band. Among the features above, considering the narrower coverage band, the electronic device 101 may include a plurality of mmWave communication modules for emitting a signal in various directions. Each of the plurality of mmWave communication modules may support beamforming and output a signal in a different direction, using the beamforming. For example, the first mmWave communication module 410 is disposed at an upper end portion of the electronic device 101, and may transmit and/or receive a signal using a first cellular communication at the upper end portion of the electronic device 101. The first mmWave communication module 410 may implement a coverage of a first cellular communication signal at the upper end portion of the electronic device 101. The second mmWave communication module 420 is disposed at one lateral portion of the electronic device 101, and may transmit and/or receive a signal using the first cellular communication at the one lateral portion of the electronic device 101. The second mmWave communication module 420 may implement a coverage of the first cellular communication signal at the one lateral portion of the electronic device 101. The third mmWave communication module 430 is disposed at the other lateral portion of the electronic device 101, and may transmit and/or receive a signal using the first cellular communication at the other lateral portion of the electronic device 101. The third mmWave communication module 430 may implement a coverage of the first cellular communication signal at the other lateral portion of the electronic device 101.

According to various embodiments, the electronic device 101 may include a GNSS circuit module 440 including various GNSS circuitry which receives a signal for measuring a position of the electronic device 101. The GNSS may indicate a system for measuring a position of the electronic device 101 using signals output from a plurality of satellites orbiting the earth. For example, the GNSS may indicate one system among a global positioning system (GPS) that the U.S. Department of Defense has developed and operated, a global navigation satellite system (GLONASS) that Russia has developed and operated, Galileo that EU has developed and operated, or Beidou that China has developed and operated.

The GNSS circuit module 440 may receive a signal output from at least one satellite, and determine a position of the electronic device 101, based on information (transmission time of the signal, position information of the satellite) included in the signal. Referring to FIG. 4A, it is illustrated that the GNSS circuit module 440 is disposed at the upper end portion of the electronic device 101, but the GNSS circuit module 440 may be disposed at various positions in accordance with an intention of a designer of the electronic device 101.

An amplitude of the signal received by the GNSS circuit module 440 may be less than an amplitude of other received signal. For example, the maximum amplitude of the signal received by the GNSS circuit module 440 may be −130 dBm. Since the amplitude of the signal received by the GNSS circuit module 440 is smaller, the performance degradation of the GNSS circuit module 440 may occur according to various causes (for example, a motion in which a user holds the electronic device 101). Referring to FIG. 4A, in order to prevent and/or reduce the reception performance degradation caused by the motion in which a user holds the electronic device 101, the GNSS circuit module 440 may be disposed at the upper end portion of the electronic device 101.

According to various embodiments, the first mmWave communication module 410, which implements a coverage of the first cellular communication signal at the upper end portion of the electronic device 101, may be disposed adjacent to the GNSS circuit module 440.

Figure 4B:
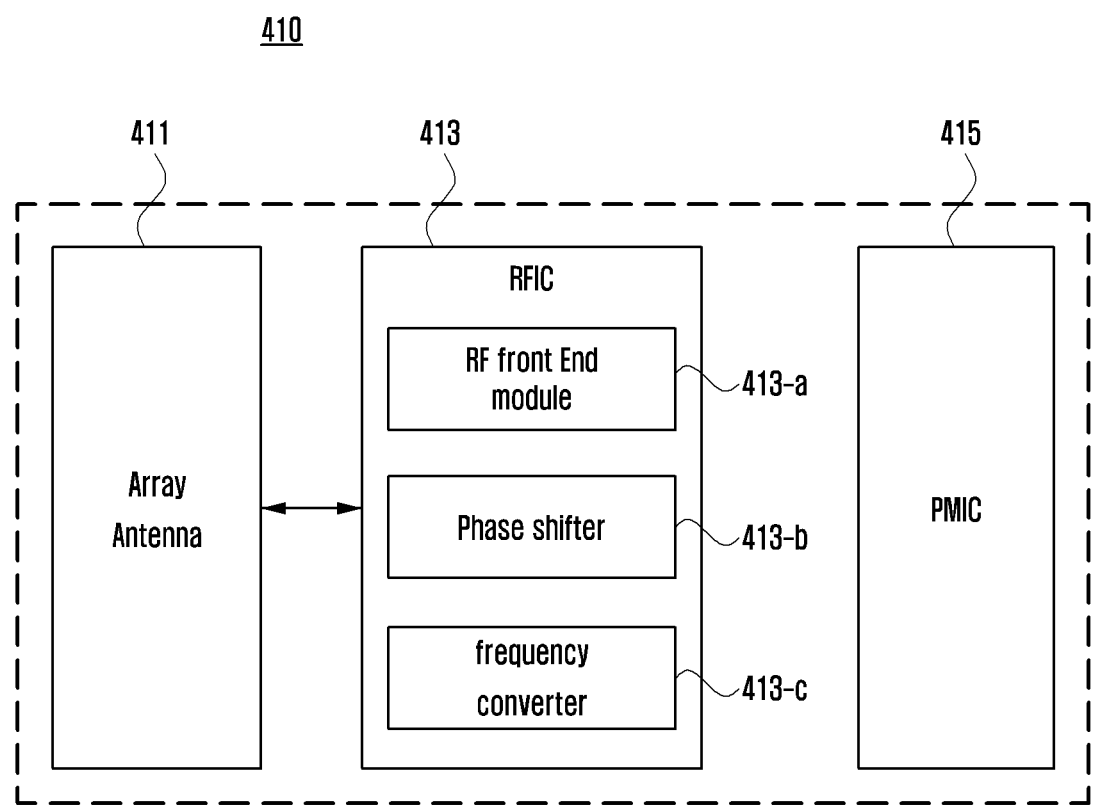
FIG. 4B is a block diagram illustrating an example mmWave communication module in an electronic device according to various embodiments.

FIG. 4B is a block diagram illustrating an example first mmWave communication module (for example, the first mmWave communication module 410 of FIG. 4A) in an electronic device according to various embodiments.

FIG. 4B illustrates a block diagram of the first mmWave communication module 410, but a second mmWave communication module (for example, the second mmWave communication module 420 of FIG. 4A) or a third mmWave communication module (for example, the third mmWave communication module 430 of FIG. 4A) may be also implemented like the first mmWave communication module 410 or similarly.

Referring to FIG. 4B, the first mmWave communication module 410 may include: an array antenna 411; a radio frequency integrate circuit (RFIC) 413 including a radio frequency (RF) front end module 413-a, a phase shifter 413-b, and a frequency converter 413-c; and a power management integrated circuit (PMIC) 415.

According to various embodiments, the array antenna 411 may be implemented by a plurality of antennas arranged therein. The array antenna 411 may implement beamforming, by which a signal is emitted in a specific direction, by means of a method of changing an intensity and a phase of a signal output from each of the plurality of antennas. The array antenna 411 may emit a signal of a frequency band (for example, 30 to 300 GHz) that the first cellular communication supports.

According to various embodiments, the RFIC 413 may generate a signal to be emitted through the array antenna 411. The RFIC 413 may include: the RF front end module 413-a configured by various components including an amplifier for amplifying an intensity of a signal, and a filter for adjusting a frequency band; the phase shifter 413-b for shifting a phase of a signal; and the frequency converter 413-c for increasing a frequency of a signal to be transmitted or decreasing a frequency of a received signal.

According to various embodiments, in order to supply, to the RFIC 413, power supplied from a power supply (not shown), the power management integrated circuit 415 may perform a function of lowering voltage. The power management integrated circuit 415 may include a DC/DC converter in order to lower voltage.

According to various embodiments, the DC/DC converter may decrease voltage using a switching mode power supply (SMPS) method. The SMPS method may indicate a method in which power is not supplied during a specific cycle using a switch, thus the average voltage is lowered. The power management integrated circuit 415 may control voltage using the SMPS method, but a switching operation used for the SMPS method may incur various types of noise (for example, ripple noise).

According to various embodiments, the GNSS circuit module 440 disposed adjacent to the first mmWave communication module 410 may receive noise incurred by the switching operation used for the SMPS method. Since an intensity of a signal that the GNSS circuit module 440 receives for measuring a position of the electronic device 101 is low, a phenomenon in which a performance of position measurement decreases due to the noise received from the first mmWave communication module 410 may occur in the GNSS circuit module 440.

According to various embodiments, the GNSS circuit module 440 may identify a reception performance through various methods. For example, the GNSS circuit module 440 may measure a GNSS reception performance by means of a carrier to noise ratio (C/No). The carrier to noise ratio is one index among indices representing the GNSS reception performance, and the increase in the carrier to noise ratio may indicate the improvement in the GNSS reception performance. Table 1 illustrates how the reception performance of the GNSS circuit module 440 varies depending, for example, on whether the first mmWave communication module 410 is activated.

TABLE 1

| whether the first mmWave communication module 410 is activated | $C/N_0$ (dB-Hz) | Performance difference |
|---|---|---|
| Deactivated (reference) | 50.7 | 0 (reference) |
| Activated | 39.4 | −11.3 |

It is noted from Table 1 that, in regard to the reception performance of the GNSS circuit module 440, the carrier to noise ratio decreases as the state of the first mmWave communication module 410 changes from a deactivation state to an activation state. The decrease in the carrier to noise ratio may indicate that a phenomenon in which the performance of position measurement decreases due to the noise received from the first mmWave communication module 410 occurs.

Table 2 below illustrates a result indicating that as the carrier to noise ratio decreases, a circular error probability (CEP) representing the accuracy of position measurement also decreases.

TABLE 2

| whether the first mmWave communication | Circular error probability (CEP) | |
|---|---|---|
| module 410 is activated | Accuracy 67th | Accuracy 90th |
| Deactivated | 37.68 | 67.05 |
| Activated | 101.05 | 375.69 |

Hereinafter, various embodiments for preventing and/or reducing the decrease in the performance of position measurement of the GNSS circuit module 440 will be described in greater detail.

Figure 5:
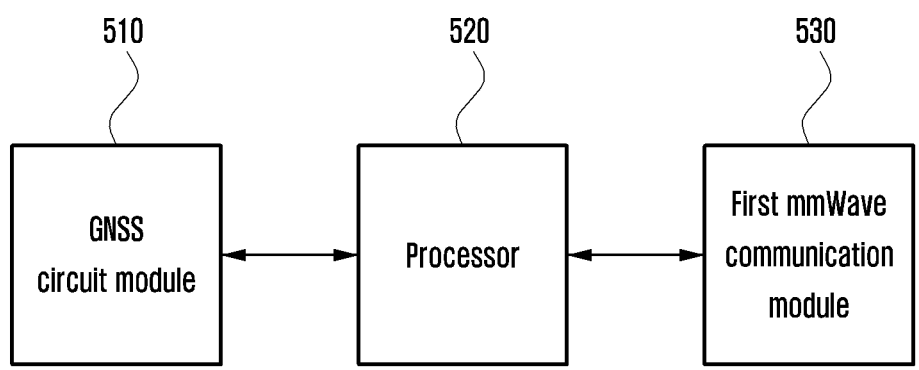
FIG. 5 is a block diagram of illustrating an example electronic device according to various embodiments.

FIG. 5 is a block diagram illustrating an example electronic device according to various embodiments.

Referring to FIG. 5, an electronic device (for example, the electronic device 101 of FIG. 1) according to various embodiments may include a GNSS circuit module (for example, the GNSS circuit module 440 of FIG. 4A) 510 (e.g., including GNSS circuitry), a processor (for example, the processor 120 of FIG. 1) 520 (e.g., including processing circuitry), and a first mmWave communication module (for example, the first mmWave communication module 410 of FIG. 4A) 530 (e.g., including communication circuitry).

According to various embodiments, the GNSS circuit module 510 may include various GNSS circuitry and receive a signal output from at least one satellite, and determine a position of the electronic device 101, based on information (transmission time of the signal, position information of the satellite) included in the signal. An amplitude of the signal received by the GNSS circuit module 510 may be less than an amplitude of other received signal. For example, the maximum amplitude of the signal received by the GNSS circuit module 510 may be −130 dBm. The GNSS circuit module 510 may receive power from a power supply (not shown), receive a signal for position measurement using the received power, and determine a position of the electronic device 101, based on the received signal. Referring to FIG. 4A, in order to prevent and/or reduce the signal reception performance degradation caused by a motion in which a user holds the electronic device 101, the GNSS circuit module 510 may be disposed at a position (for example, the upper end portion of the electronic device 101) that is less affected by the signal reception performance degradation caused by the motion in which the user holds the electronic device 101.

According to various embodiments, the first mmWave communication module 530 may include various communication circuitry and transmit and/or receive data via a first cellular communication. In order to support the first cellular communication, the first mmWave communication module 530 may transmit and/or receive a signal having a frequency band of 30 to 300 GHz having a wavelength in a unit of mm. The first mmWave communication module 530 may be disposed at the upper end portion of the electronic device 101 in order to emit a signal in an upward direction of the electronic device 101 or to receive a signal transmitted from the upward direction of the electronic device 101. The first mmWave communication module 530 may be disposed at the upper end portion of the electronic device 101 to be disposed adjacent to the GNSS circuit module 510. Noise may be incurred by an operation of a power management integrated circuit (for example, the power management integrated circuit 415 of FIG. 4B) included in the first mmWave communication module 530. The incurred noise may be transmitted to the GNSS circuit module 510 adjacent to the first mmWave communication module 530, and may decrease a position measurement performance of the GNSS circuit module 510.

According to various embodiments, the processor 520 may include various processing circuitry and perform various operations in order to prevent and/or reduce the decrease in the position measurement performance of the GNSS circuit module 510. The processor 520 may indicate an application processor (for example, the processor 120 of FIG. 1) or a communication processor (for example, the first communication processor 312 of FIG. 3 or the second communication processor 314 of FIG. 3).

According to various embodiments, the processor 520 may identify that the GNSS circuit module 510 starts the position measurement in a state where the first mmWave communication module 530 is activated. Upon starting to perform the position measurement of the electronic device 101, the GNSS circuit module 510 may transmit, to the processor 520, a signal for indicating a start of position measurement of the electronic device 101. Upon receiving the signal for indicating a start of position measurement of the electronic device 101, the processor 520 may identify that the GNSS circuit module 510 starts the position measurement.

According to various embodiments, the GNSS circuit module 510 starts the position measurement, and in response thereto, the processor 520 may identify characteristics of activated applications. The processor 520 may determine whether to deactivate the first mmWave communication module 510, based on the characteristics of activated applications.

According to various embodiments, an activated application may include a foreground application operating while being displayed on a display (for example, the display device 160 of FIG. 1) or a background application operating while not being displayed on the display 160.

According to various embodiments, characteristics of an application may include a characteristic of indicating whether an activated application supports a function using position information. Upon identifying that an application using position information or an application supporting a location based service (LBS) (for example, an application supporting a phone feature used in emergency situations (a function of calling a police station, an ambulance, or a fire station), navigation supporting a road guiding function, a fitness application providing exercise information, a location based game application, and an application supporting a position sharing function) is activated, the processor 520 may determine to deactivate the first mmWave communication module 530.

According to various embodiments, a characteristic of an application may include a characteristic with respect to a cycle by which an activated application requests position information of the electronic device 101. The processor 520 may identify the position information request cycle, and may determine whether to deactivate the first mmWave communication module 530, based on the position information request cycle. For example, the processor 520 may compare the position information request cycle with a preset value, and may determine to deactivate the first mmWave communication module 530 when the position information request cycle is less than the preset value.

According to various embodiments, the processor 520 may identify a characteristic of an application, based on mapping data to which position information request frequency and usage time of the GNSS circuit module 510 for each of a plurality of applications installed on the electronic device 101 are mapped.

According to various embodiments, the processor 520 may identify position information usage frequency and activation time of the GNSS circuit module 510 for each of the plurality of applications installed on the electronic device 101 while each of the applications is being activated. The processor 520 may generate or update mapping data, based on the identification result. In case the processor supports machine learning or deep learning, the processor 520 may automatically collect the position information usage frequency and the activation time of the GNSS circuit module 510 while the applications are being activated, and may automatically update mapping data. The mapping data may be implemented as shown, for example, in Table 3.

TABLE 3

| | Application name | Position information usage frequency | Activation time of the GNSS circuit module 510 | Position information importance |
|---|---|---|---|---|
| 1 | T-Map | 50 times | 32 hours 23 minutes 30 seconds | ○ |
| 2 | Google Map | 45 times | 25 hours 15 minutes 14 seconds | ○ |
| 3 | PokeMon | 20 times | 15 hours 30 minutes 10 seconds | ○ |
| 4 | S-Health | 21 times | 10 hours 21 minutes 12 seconds | ○ |
| 5 | KakaoMap | 5 times | 2 hours 11 minutes 11 seconds | ○ |
| 6 | Melon | 4 times | 5 minutes 10 seconds | X |
| 7 | Netflix | 3 times | 2 minutes 10 seconds | X |

Referring to Table 3, the mapping data may include the position information usage frequency and the activation time of the GNSS circuit module 510 of each of the plurality of applications. The mapping data may include position information importance which indicates that the operation of the GNSS circuit module 510 takes priority over the operation of the first mmWave communication module 530. In case a specific application is executed, the position information importance may include information indicating that the GNSS circuit module 510 should be activated (or the first mmWave communication module 530 should be deactivated).

According to various embodiments, the mapping data may further include authority information relating to whether each of applications can access position information of the electronic device 101. With respect to whether to access position information, the applications may be differently configured. An application having authority which enables the access to position information may acquire position information of the electronic device 101, which the GNSS circuit module 510 has generated, and may support various functions depending on the acquired position information. An application having no authority which enables the access to position information may not use position information of the electronic device 101. The processor 520 may identify whether an activated application has access authority over the position information of the electronic device 101, based on the mapping data, and may determine whether to deactivate the first mmWave communication module 530, based on the identification result. For example, upon identifying that an application having access authority over the position information of the electronic device 101 is activated, the processor 520 may determine to deactivate the first mmWave communication module 530.

According to various embodiments, it is disclosed that the mapping data is generated and updated on the electronic device 101, but the mapping data may be generated and updated at a separate external server. The external sever may receive usage information of the GNSS circuit module 510 of an electronic device, pieces of which correspond to various users, respectively, and may generate and update the mapping data. The electronic device 101 may identify a characteristic of an activated application, based on the mapping data having been received from the external server, and may determine whether to deactivate the first mmWave communication module 530.

According to various embodiments, the processor 520 may determine whether to deactivate the first mmWave communication module 530, based on whether a signal, through which an external electronic device (not shown) requests the position information of the electronic device 101, is received. For example, while the electronic device 101 performs an emergency call (for example, E911) to call a fire station or a police station, the electronic device 101 may receive, from a sever operated by a first station or a police station, a signal for requesting the position information of the electronic device 101. Upon receiving the signal for requesting the position information of the electronic device 101, the processor 520 may determine to deactivate the first mmWave communication module 530.

According to various embodiments, the deactivation of the first mmWave communication module 530 may indicate an operation of cutting off power supplied to the first mmWave communication module 530. The activation of the first mmWave communication module 530 may indicate an operation of supplying power to the first mmWave communication module 530.

According to various embodiments, the processor 520 may identify a characteristic of an activated application, and upon identifying that the activated application supports a position based function, may deactivate the first mmWave communication module 530. The electronic device 101 deactivates the first mmWave communication module 530, and may thus prevent and/or reduce the performance degradation of the GNSS circuit module 510 which is caused by the noise incurred by the activation of the first mmWave communication module 530.

According to various embodiments, based on a characteristic of an application, the processor 520 may determine to maintain the activation state of the first mmWave communication module 530.

According to various embodiments, a characteristic of an application may include a characteristic indicating whether an activated application supports a function which operates using a first cellular communication. In case the first cellular communication includes a fifth generation mobile communication method, the activated application may be an application supporting a function (for example, telemedicine, autonomous driving, augmented reality, or virtual reality) requiring ultra-low latency (ULLLC) which may be implemented by the fifth generation mobile communication method. Upon identifying that the activated application supports a function which operates using the first cellular communication, the processor 520 may determine to enable the first mmWave communication module 530 to be maintained in the activation state.

According to various embodiments, a characteristic of an application may include information related to data usage of an application via a first cellular communication. In order to use a function that the application supports, the information related to data usage via the first cellular communication may include information related to a size of data transmitted or received via the first cellular communication. The processor 520 may determine whether to maintain the activation state of the first mmWave communication module 530, based on a size of data that an activated application transmits or receives via the first cellular communication. For example, upon identifying that the size of data which an activated application transmits or receives via the first cellular communication is equal to or greater than a preset value, the processor 520 may determine to enable the first mmWave communication module 530 to be maintained in the activation state.

According to various embodiments, the processor 520 may activate another mmWave communication module (for example, the second mmWave communication module 420 of FIG. 4A or the third mmWave communication module 430 of FIG. 4A) after deactivating the first mmWave communication module 530. The second mmWave communication module 420 and the third mmWave communication module 430 are communication modules supporting the first cellular communication, and may emit signals in a direction different from a direction in which the first mmWave communication module 410 emits a signal. The processor 520 may identify a performance of the first cellular communication which is performed using the second mmWave communication module 420 or the third mmWave communication module 430.

According to various embodiments, upon identifying that the performance of the first cellular communication is equal to or less than a preset value, the processor 520 may transmit and/or receive data using other cellular communication different from the first cellular communication.

According to various embodiments, the electronic device 101 may further include a second communication module supporting a second cellular communication which is different from the first cellular communication. Upon identifying that the performance of the first cellular communication is equal to or less than a preset value, the processor 520 may activate the second communication module (not shown) supporting the second cellular communication, and transmit and/or receive data via the second cellular communication. A cellular communication may indicate one communication method among a fifth generation mobile communication method using a frequency band of 6 GHz or less, a fourth generation mobile communication method (for example, long-term evolution (LTE), LTE-advanced (LTE-A), and LTE advanced pro (LTE-A pro)), and a third generation mobile communication method. For example, upon identifying that the performance of the first cellular communication is equal to or less than a preset value, the processor 520 may activate one communication module among a communication module supporting other cellular communication method using a frequency band of 6 GHz or less, a communication module supporting a fourth generation mobile communication method, or a communication module supporting a third generation mobile communication method, and may transmit and/or receive data.

According to various embodiments, the processor 520 may trace the operation of the GNSS circuit module 510 while the first mmWave communication module 530 is being deactivated. The processor 520 may trace the operation of the GNSS circuit module 510, and upon identifying that the position measurement of the GNSS circuit module 510 is not performed, may reactivate the first mmWave communication module 530.

According to various embodiments, the GNSS circuit module 510 starts the position measurement, and in response thereto, the processor 520 may identify the performance of the GNSS circuit module 510. The performance of the GNSS circuit module 510 may include the accuracy of the position of the electronic device 101, which the GNSS circuit module 510 measures. For example, the processor 520 may identify the performance of the GNSS circuit module 510 using the carrier to noise ratio or the circular error probability.

According to various embodiments, based on the performance of the GNSS circuit module 510, the processor 520 may determine whether to perform an operation of determining whether to deactivate, based on a characteristic of an application, the first mmWave communication module 530. For example, in case the performance of the GNSS circuit module 510 is equal to or greater than a preset value (corresponding to a case in which the electronic device 101 is positioned in an area having a good GNSS signal reception performance), the processor 520 may determine not to perform the operation of determining whether to deactivate the first mmWave communication module 530. The first mmWave communication module 530 may be maintained in the activation state and may perform the first cellular communication.

According to the embodiment disclosed above, it is disclosed that the processor deactivates the first mmWave communication module 530, but the processor 520 may control a power supply (not shown) in accordance with a method of decreasing an amount of power supplied to the first mmWave communication module 530 or adjust a switching cycle of the power management integrated circuit 415 of the first mmWave communication module 530, by not deactivating the first mmWave communication module 530.

Figure 6:
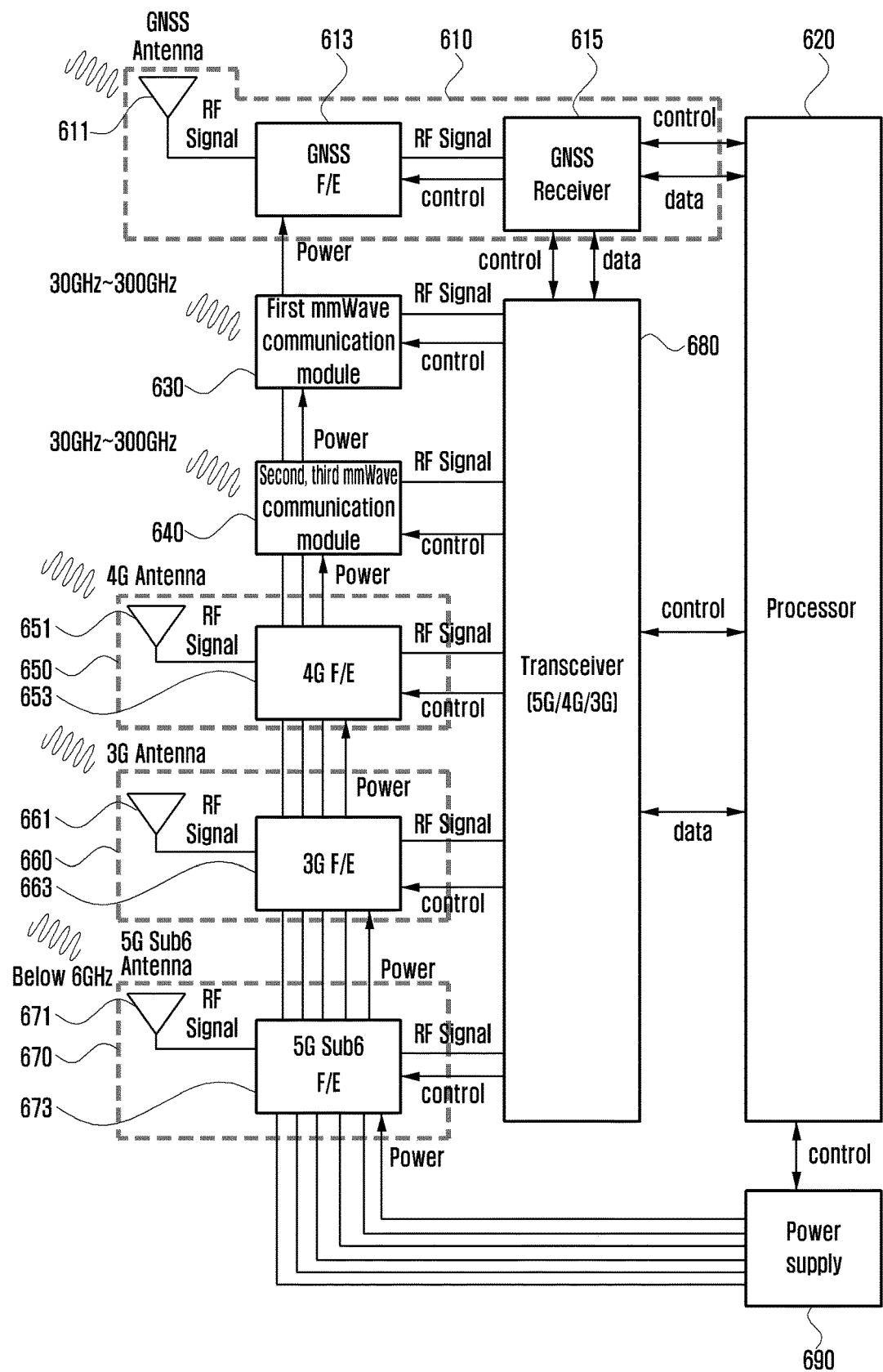
FIG. 6 is a diagram illustrating an example of controlling power supplied to a first mmWave communication module or a GNSS reception module in an electronic device according to various embodiments.

FIG. 6 is a diagram illustrating an example of controlling power supplied to a first mmWave communication module or a GNSS reception module in an electronic device according to various embodiments.

Referring to FIG. 6, an electronic device (for example, the electronic device 101 of FIG. 1) according to various embodiments may include: a GNSS circuit module (for example, the GNSS circuit module 510 of FIG. 5) 610 (e.g., including GNSS circuitry); a processor (for example, the processor 520 of FIG. 5) 620 (e.g., including processing circuitry); a first mmWave communication module (for example, the first mmWave communication module 530 of FIG. 5) 630 (e.g., including communication circuitry); a second mmWave communication module and a third mmWave communication module (for example, the second mmWave communication module 420 and the third mmWave communication module 430 of FIG. 4A) 640 (e.g., including communication circuitry); a communication module (e.g., including communication circuitry) 650 supporting a fourth generation mobile communication; a communication module (e.g., including communication circuitry) 660 supporting a third generation mobile communication; a communication module (e.g., including communication circuitry) 670 supporting a fifth generation mobile communication using a frequency band of 6 GHz or less; a transceiver 680; and a power supply 690.

According to various embodiments, the GNSS circuit module 610 may include various GNSS circuitry including: a GNSS antenna 611 for receiving, from an external apparatus (for example, a satellite), a signal for measuring a position of the electronic device 101; a GNSS front end 613 including an amplifier (not shown) for amplifying the received signal and a filter for removing noise from the received signal; and a GNSS receiver 615 for performing an operation of modulating the received signal or an operation of determining the position of the electronic device 101, based on the modulated signal. In order to activate the amplifier, the GNSS front end 613 may receive power supplied from the power supply 690.

According to various embodiments, the first mmWave communication module 630 may include various communication circuitry and transmit and/or receive data via a first cellular communication. In order to support the first cellular communication, the first mmWave communication module 630 may transmit and/or receive a signal having a frequency band of 30 to 300 GHz having a wavelength in a unit of mm. The first mmWave communication module 630 may be disposed at an upper end portion of the electronic device 101 in order to emit a signal in an upward direction of the electronic device 101 or to receive a signal transmitted from the upward direction of the electronic device 101.

According to various embodiments, the second mmWave communication module and the third mmWave communication module 640 may include various communication circuitry and transmit and/or receive data via the first cellular communication. In order to support the first cellular communication, the second mmWave communication module and the third mmWave communication module 640 may transmit and/or receive a signal having a frequency band of 30 to 300 GHz having a wavelength in a unit of mm. The second mmWave communication module may be disposed at one lateral portion of the electronic device 101 and may implement a coverage of a first cellular communication signal to be transmitted or received at the one lateral portion of the electronic device 101. The third mmWave communication module may be disposed at the other lateral portion of the electronic device 101 and may implement a coverage of a first cellular communication signal to be transmitted or received at the other lateral portion of the electronic device 101.

According to various embodiments, the processor 620 may include various processing circuitry and deactivate the first mmWave communication module 630, and transmit and/or receive data via the first cellular communication using the second mmWave communication module and the third mmWave communication module 640.

According to various embodiments, the communication module 670 may include various communication circuitry supporting a fifth generation mobile communication using a frequency band of 6 GHz or less may transmit and/or receive a signal having a frequency band of 6 GHz or less. To this end, the communication module 670 supporting a fifth generation mobile communication using a frequency band of 6 GHz or less may include: an antenna 671 for emitting or receiving a signal; and a front end 673 including an amplifier for amplifying the received signal and a filter for removing noise from the received signal.

According to various embodiments, in case a quality of the first cellular communication using the second mmWave communication module and the third mmWave communication module 640 is equal to or less than a preset value (for example, a case in which a size of a coverage area is equal to or less than a preset value), the processor 620 may activate the communication module 670 supporting a fifth generation mobile communication using a frequency band of 6 GHz or less. The processor 620 may transmit and/or receive data using the communication module 670 supporting a fifth generation mobile communication using a frequency band of 6 GHz or less.

According to various embodiments, the communication module 650 may include various communication circuitry supporting a fourth generation mobile communication may transmit and/or receive data using a signal within a frequency band supported by a fourth generation mobile communication. To this end, the communication module 650 supporting a fourth generation mobile communication may include: an antenna 651 for emitting or receiving a signal; and a front end 653 including an amplifier for amplifying the received signal and a filter for removing noise from the received signal.

According to various embodiments, in case a quality of the first cellular communication using the second mmWave communication module and the third mmWave communication module 640 is equal to or less than a preset value (for example, a case in which a size of a coverage area is equal to or less than a preset value), the processor 620 may activate the communication module 650 supporting a fourth generation mobile communication. The processor 620 may transmit and/or receive data using the communication module 650 supporting a fourth generation mobile communication.

According to various embodiments, the communication module 660 may include various communication circuitry supporting a third generation mobile communication may transmit and/or receive data using a signal within a frequency band supported by a third generation mobile communication. To this end, the communication module 660 supporting a third generation mobile communication may include: an antenna 661 for emitting or receiving a signal; and a front end 663 including an amplifier for amplifying the received signal and a filter for removing noise from the received signal.

According to various embodiments, in case a quality of the first cellular communication using the second mmWave communication module and the third mmWave communication module 640 is equal to or less than a preset value (for example, a case in which a size of a coverage area is equal to or less than a preset value), the processor 620 may activate the communication module 660 supporting a third generation mobile communication. The processor 620 may transmit and/or receive data using the communication module 660 supporting a third generation mobile communication.

According to various embodiments, the transceiver 680 may control at least one communication module among a plurality of communication modules (for example, the first mmWave communication module 630, the second mmWave communication module and the third mmWave communication module 640, the communication module 670 supporting a fifth generation mobile communication using a frequency band of 6 GHz or less, the communication module 650 supporting a fourth generation mobile communication, or the communication module 660 supporting a third generation mobile communication). The transceiver 680 may include an analog to digital converter (ADC) (not shown) which converts analog signals that a plurality of communication modules have received, into digital signals, and a digital to analog converter (DAC) (not shown) which converts digital data to be transmitted, into an analog signal satisfying each communication standard.

According to various embodiments, the power supply 690 may supply, to a plurality of communication modules, power supplied by a battery (for example, the battery 189 of FIG. 1). The power supply 690 may be connected to the plurality of communication modules in accordance with various methods. FIG. 6 illustrates an embodiment in which the power supply 690 may be connected to the plurality of communication modules in the shape of a cascade, but the power supply may be connected to the plurality of communication modules in various shapes.

According to various embodiments, based on a characteristic of an activated application, the processor 620 may control the first mmWave communication module 630 or the GNSS circuit module 610. The processor 620 may control the first mmWave communication module 630 or the GNSS circuit module 610 in accordance with a method in which the power supply 690 controls an operation of supplying power to the first mmWave communication module 630 or the GNSS circuit module 610.

Figure 7:
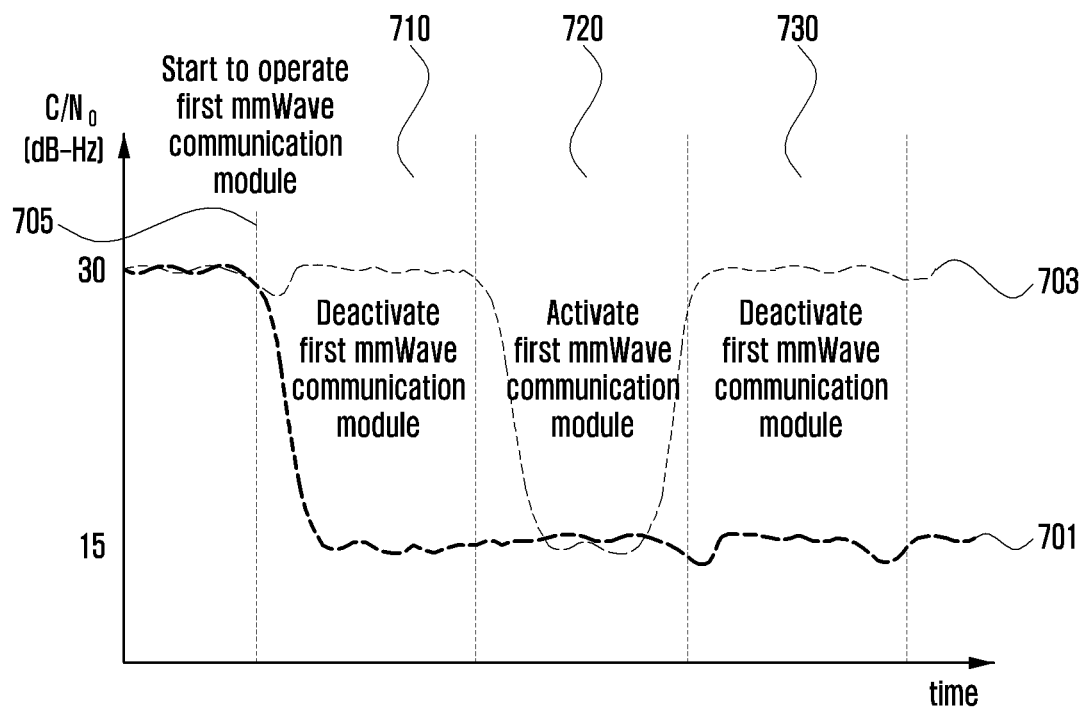
FIG. 7 is a diagram illustrating example GNSS reception performance depending on an operation of an electronic device in an electronic device according to various embodiments.

FIG. 7 is a diagram illustrating example GNSS reception performance depending on an operation of an electronic device in an electronic device according to various embodiments.

FIG. 7 illustrates a graph illustrating a reception performance of a GNSS circuit module (for example, the GNSS circuit module 510 of FIG. 5) while an electronic device (for example, the electronic device 101 of FIG. 1) according to various embodiments performs the embodiments illustrated in FIGS. 5 and 6, which correspond to an embodiment 703.

By comparing the embodiment 703 with a comparative example 701, it is noted that the embodiment and the comparative example are similar to each other in that the carrier to noise ratio (hereinafter, C/No) before the starting (operation 705) of the operation of a first mmWave communication module (for example, the first mmWave communication module 530 of FIG. 5) is 30 dB-Hz.

As noted from the comparison between the embodiment 703 and the comparative example 701, after the starting (operation 710) of the operation of the first mmWave communication module, the first mmWave communication module 530 is deactivated in the embodiment 703, while the first mmWave communication module 530 is maintained in the activation state in the comparative example 701. In other words, it is noted that C/No of the embodiment 703 is maintained as 30 dB-Hz, while C/No of the comparative example 701 is decreased to 15 dB-Hz. The electronic device 101 according to an embodiment can improve the performance of the GNSS circuit module 510 by deactivating the first mmWave communication module 530.

Also, as noted from the comparison between the embodiment 703 and the comparative example 701, in case (operation 720) where the first mmWave communication module is switched from the deactivation state to the activation state, the first mmWave communication module 530 is maintained in the activation state in both the comparative example 701 and the embodiment 703. In other words, it is noted that C/No of the embodiment 703 is decreased to 15 dB-Hz which is the same as C/No of the comparative example 701.

As noted from the comparison between the embodiment 703 and the comparative example 701, in case (operation 730) where the first mmWave communication module is switched from the activation state to the deactivation state, the first mmWave communication module 530 is deactivated in the embodiment 703, while the first mmWave communication module 530 is activated in the comparative example 701. In other words, it is noted that C/No of the embodiment 703 increases to 30 dB-Hz, while C/No of the comparative example 701 is maintained at 15 dB-Hz, showing a low performance. The electronic device 101 according to an embodiment can improve the performance of the GNSS circuit module 510 by deactivating the first mmWave communication module 530.

An electronic device according to various example embodiments may include: a GNSS circuit module comprising GNSS circuitry configured to receive a signal for measuring a position of the electronic device; a first mmWave communication module comprising communication circuitry disposed adjacent to the GNSS circuit module and configured to perform a first cellular communication; and a processor, wherein the processor may be configured to receive, from the GNSS circuit module, a signal indicating a start of position measurement of the electronic device based on the first mmWave communication module being activated, to determine whether to deactivate the first mmWave communication module based on a characteristic of an application activated on the processor, and to control the first mmWave communication module, based on determining whether to deactivate the first mmWave communication module.

In the electronic device according to various example embodiments, the processor may be configured to identify whether the activated application requests a position of the electronic device, and to determine whether to deactivate the first mmWave communication module based on the identification.

In the electronic device according to various example embodiments, the processor may be configured to identify a cycle by which the activated application requests position information of the electronic device, and to determine whether to deactivate the first mmWave communication module based on the request cycle.

The electronic device according to various example embodiments may further include a memory for storing mapping data to which the priority with respect to the GNSS circuit module is mapped based on position information request frequency and usage time of the GNSS circuit module for each of applications, and the processor may be configured to determine whether to deactivate the first mmWave communication module based on the activated application and the mapping data.

In the electronic device according to various example embodiments, the mapping data may further include authority information on access to position information of the electronic device for each of the applications, and the processor may be configured to determine whether to deactivate the first mmWave communication module based on the activated application and the authority information included in the mapping data.

The electronic device according to various example embodiments may include a second communication module comprising communication circuitry configured to transmit and/or receive data via a second cellular communication, and the processor may be configured to identify whether a request signal for requesting position information of the electronic device, transmitted by an external electronic device via the second cellular communication, is received, and to determine whether to deactivate the first mmWave communication module based on whether the request signal is received.

In the electronic device according to various example embodiments, the processor may be configured to identify information related to data usage via the first cellular communication of the activated application, and to determine whether to deactivate the first mmWave communication module, based on information related to the data usage.

In the electronic device according to various example embodiments, the processor may be configured to trace the operation of the GNSS circuit module based on the first mmWave communication module being deactivated, and, based on identifying that position measurement of the GNSS circuit module not being performed, activate the first mmWave communication module.

The electronic device according to various example embodiments may further include a second mmWave communication module including communication circuitry configured to emit a signal in a direction different from an emitting direction of a signal output from the first mmWave communication module and to perform the first cellular communication, and based on identifying that the first mmWave communication module being deactivated, the processor may be configured to activate the second mmWave communication module.

The electronic device according to various example embodiments may further include a second communication module including communication circuitry configured to perform a second cellular communication different from the first cellular communication, and the processor may be configured to determine whether to activate the second communication module based on quality information of the first cellular communication using the second mmWave communication module, and, based on identifying that the second communication module is activated, perform the second cellular communication using the second communication module.

In the electronic device according to various example embodiments, the processor may be configured to change a position measurement cycle of the electronic device including the GNSS circuit module, based on a characteristic of an application, and control the first mmWave communication module based on the changed position measurement cycle.

Figure 8:
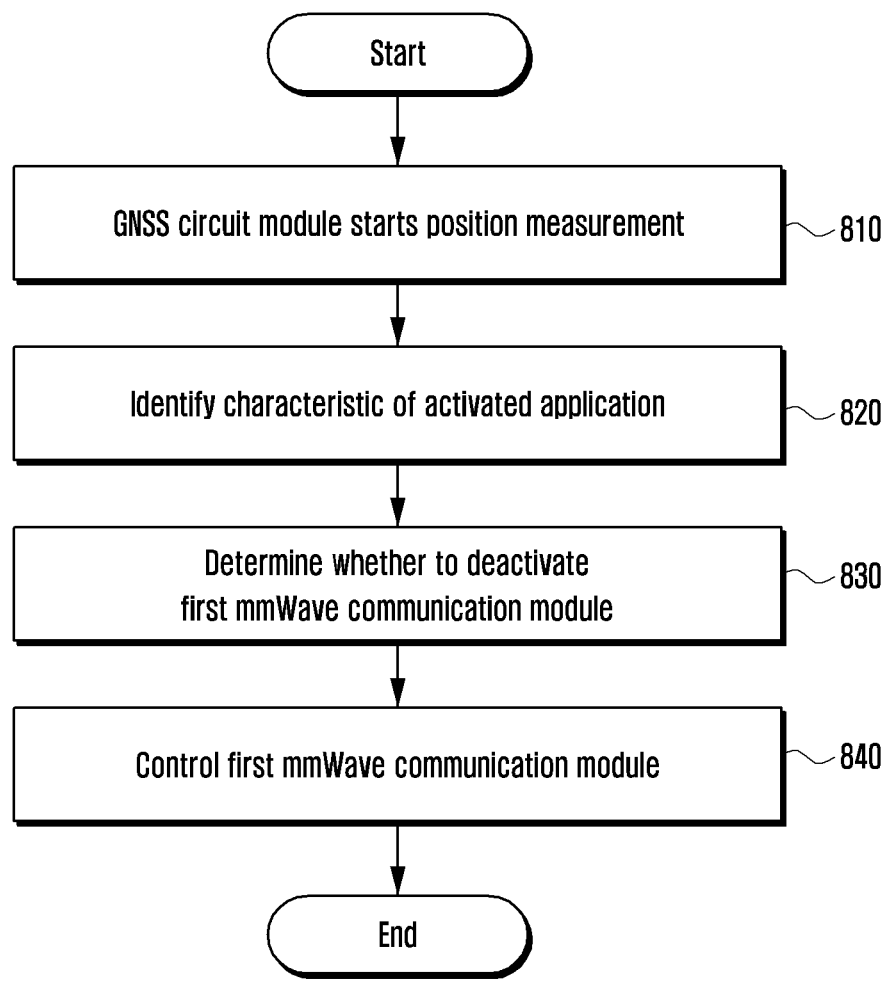
FIG. 8 is a flowchart illustrating an example operation method of an electronic device according to various embodiments.

FIG. 8 is a flowchart illustrating an example operation method 800 of an electronic device according to various embodiments.

According to various embodiments, in operation 810, a GNSS circuit module (for example, the GNSS circuit module 510 of FIG. 5) may start to measure a position of the electronic device 101.

According to various embodiments, the GNSS circuit module 510 may receive a signal output from at least one satellite, and determine a position of the electronic device 101, based on information (transmission time of the signal, position information of the satellite) included in the signal. An amplitude of the signal received by the GNSS circuit module 510 may be less than an amplitude of other received signal. For example, the maximum amplitude of the signal received by the GNSS circuit module 510 may be −130 dBm. The GNSS circuit module 510 may receive power from a power supply (for example, the power supply 690 of FIG. 6), receive a signal for position measurement using the received power, and determine a position of the electronic device 101, based on the received signal.

According to various embodiments, a first mmWave communication module (for example, the first mmWave communication module 530 of FIG. 5) may be in the activation state in a state where the GNSS circuit module 510 starts to measure a position of the electronic device 101.

According to various embodiments, in operation 820, a processor (for example, the processor 520 of FIG. 5) may identify a characteristic of an activated application.

According to various embodiments, a characteristic of an application may include a characteristic of indicating whether an activated application supports a function using position information. Upon identifying that an application using position information or an application supporting a location based service (LBS) (for example, an application supporting a phone feature used in emergency situations (a function of calling a police station, an ambulance, or a fire station), navigation supporting a road guiding function, a fitness application providing exercise information, a location based game application, and an application supporting a position sharing function) is activated, the processor 520 may determine to deactivate the first mmWave communication module 530.

According to various embodiments, a characteristic of an application may include a characteristic with respect to a cycle by which an activated application requests position information of the electronic device 101. The processor 520 may identify the position information request cycle, and may determine whether to deactivate the first mmWave communication module 530, based on the position information request cycle. For example, the processor 520 may compare the position information request cycle with a preset value, and may determine to deactivate the first mmWave communication module 530 when the position information request cycle is less than the preset value.

According to various embodiments, the processor 520 may identify a characteristic of an application, based on mapping data to which position information request frequency and usage time of the GNSS circuit module 510 for each of a plurality of applications installed on the electronic device 101 are mapped.

According to various embodiments, the processor 520 may determine whether to deactivate the first mmWave communication module 530, based on whether a signal, through which an external electronic device (not shown) requests the position information of the electronic device 101, is received. For example, while the electronic device 101 performs an emergency call (for example, E911) to call a fire station or a police station, the electronic device 101 may receive, from a sever operated by a first station or a police station, a signal for requesting position information of the electronic device 101. Upon receiving the signal for requesting position information of the electronic device 101, the processor 520 may determine to deactivate the first mmWave communication module 530.

According to various embodiments, in operation 830, the processor 520 may determine whether to deactivate a first mmWave communication module (for example, the first mmWave communication module 530 of FIG. 5), based on a characteristic of an activated application.

According to various embodiments, in operation 840, the processor 520 may control the first mmWave communication module 530 based, for example, on the determination made in operation 830.

According to various embodiments, upon determining to deactivate the first mmWave communication module 530, the processor 520 may control a power supply (for example, the power supply 690 of FIG. 6) to cut off power supplied to the first mmWave communication module 530.

According to various embodiments, upon determining to maintain the first mmWave communication module 530 to be in the activation state, the processor 520 may control the power supply 690 so as to cut off power supplied to the GNSS circuit module 510.

Figure 9:
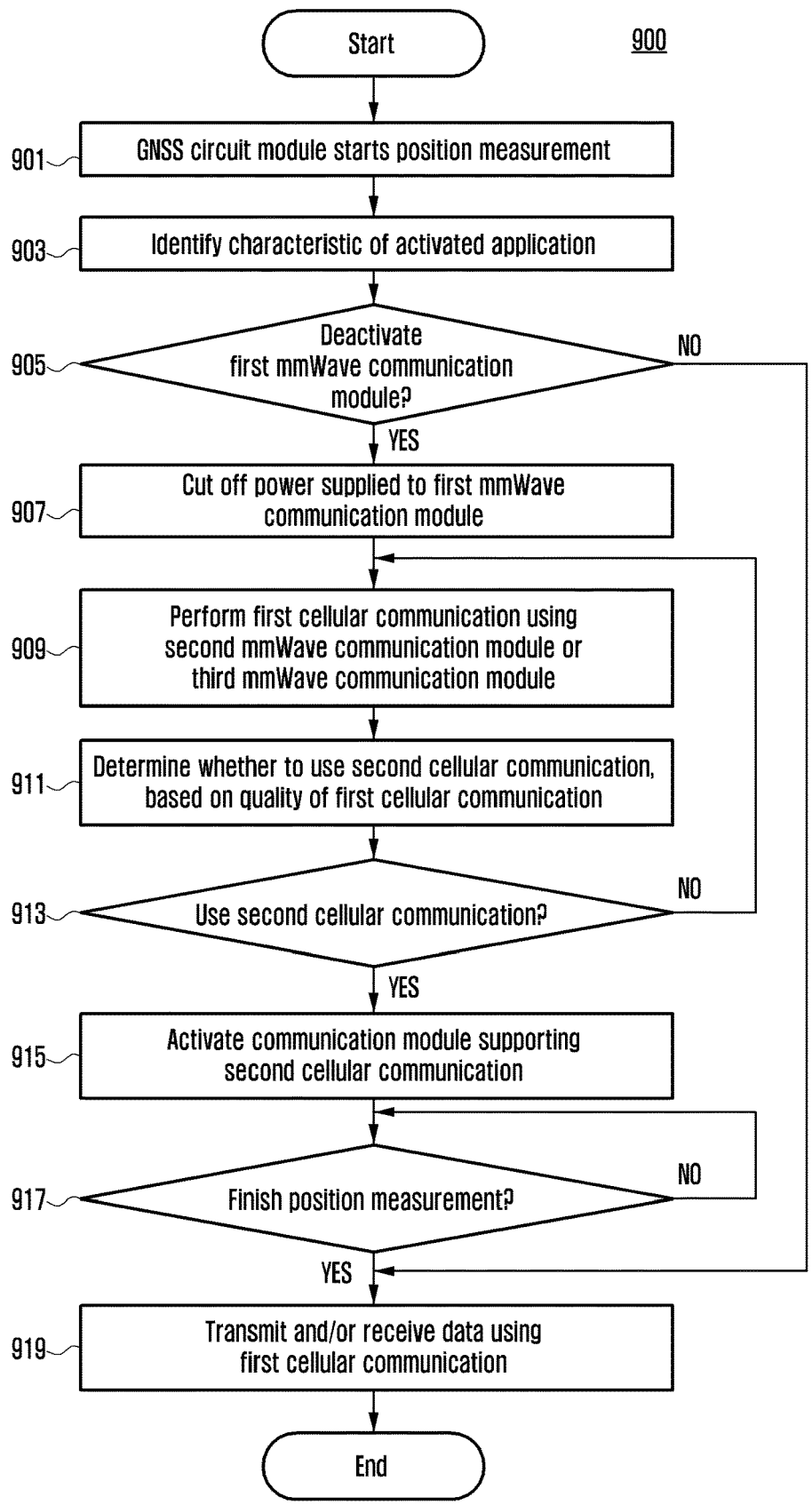
FIG. 9 is a flowchart illustrating an example operation method of an electronic device according to various embodiments.

FIG. 9 is a flowchart illustrating an example operation method 900 of an electronic device according to various embodiments.

According to various embodiments, in operation 901, a GNSS circuit module (for example, the GNSS circuit module 510 of FIG. 5) may start to measure a position of the electronic device 101.

According to various embodiments, the GNSS circuit module 510 may receive a signal output from at least one satellite, and determine a position of the electronic device 101, based on information (transmission time of the signal, position information of the satellite) included in the signal. An amplitude of the signal received by the GNSS circuit module 510 may be less than an amplitude of other received signal. For example, the maximum amplitude of the signal received by the GNSS circuit module 510 may be −130 dBm. The GNSS circuit module 510 may receive power from a power supply (for example, the power supply 690 of FIG. 6), receive a signal for position measurement using the received power, and determine a position of the electronic device 101, based on the received signal.

According to various embodiments, a first mmWave communication module (for example, the first mmWave communication module 530 of FIG. 5) may be in the activation state, in a state where the GNSS circuit module 510 starts to measure a position of the electronic device 101.

According to various embodiments, in operation 903, a processor (for example, the processor 520 of FIG. 5) may identify a characteristic of an activated application.

According to various embodiments, a characteristic of an application may include a characteristic of indicating whether an activated application supports a function using position information.

According to various embodiments, in operation 905, the processor 520 may determine whether to deactivate the first mmWave communication module 530.

According to various embodiments, upon identifying that an application using position information or an application supporting a location based service (LBS) (for example, an application supporting a phone feature used in emergency situations (a function of calling a police station, an ambulance, or a fire station), navigation supporting a road guiding function, a fitness application providing exercise information, a location based game application, and an application supporting a position sharing function) is activated, the processor 520 may determine to deactivate the first mmWave communication module 530.

According to various embodiments, upon determining to maintain the first mmWave communication module 530 to be in the activation state, the processor 520 may transmit and/or receive data via a first cellular communication.

According to various embodiments, in operation 907, upon determining to deactivate the first mmWave communication module 530, the processor 520 may control a power supply (for example, the power supply 690 of FIG. 6) to cut off power supplied to the first mmWave communication module 530.

According to various embodiments, in operation 909, the processor 520 may perform the first cellular communication using a second mmWave communication module (for example, the second mmWave communication module 420 of FIG. 4A) or a third mmWave communication module (for example, the third mmWave communication module 430 of FIG. 4A).

According to various embodiments, the processor 520 may activate another mmWave communication module (for example, the second mmWave communication module 420 of FIG. 4A or the third mmWave communication module 430 of FIG. 4A) after deactivating the first mmWave communication module 530. The second mmWave communication module 420 and the third mmWave communication module 430 are communication modules supporting the first cellular communication, and may emit signals in a direction different from a direction in which the first mmWave communication module 410 emits a signal.

According to various embodiments, in operation 911, the processor 520 may determine whether to use a second cellular communication, based on a quality of the first cellular communication.

According to various embodiments, a quality of the first cellular communication may indicate a quality related to a coverage of the first cellular communication using the second mmWave communication module 420 or the third mmWave communication module 430. The processor 520 may identify whether a coverage of the first cellular communication is equal to or less than a preset value, and upon identifying that the coverage of the first cellular communication is equal to or less than the preset value, may determine to transmit and/or receive data using a second cellular communication.

According to various embodiments, a second cellular communication may indicate a cellular communication different from the first cellular communication. For example, a second cellular communication may indicate one communication method among a fifth generation mobile communication method using a frequency band of 6 GHz or less, a fourth generation mobile communication method (for example, long-term evolution (LTE), LTE-advanced (LTE-A), and LTE advanced pro (LTE-A pro)), and a third generation mobile communication method.

According to various embodiments, in operation 913, the processor 520 may identify whether to use the second cellular communication.

According to various embodiments, upon determining not to use the second cellular communication, the processor 520 may perform the first cellular communication using the second mmWave communication module 420 or the third mmWave communication module 430.

According to various embodiments, in operation 915, the processor 520 may activate a communication module supporting the second cellular communication.

According to various embodiments, the communication module supporting the second cellular communication may indicate one communication module among a communication module (for example, the communication module 650 of FIG. 6) supporting a fourth generation mobile communication, a communication module (for example, the communication module 660 of FIG. 6) supporting a third generation mobile communication, or a communication module (for example, the communication module 670 of FIG. 6) supporting a fifth generation mobile communication using a frequency band of 6 GHz or less.

According to various embodiments, the priority for each of the communication modules may be designated. According to the designated priority, the processor 520 may activate one communication module among the communication modules supporting the second cellular communication.

According to various embodiments, in operation 917, the processor 520 may identify whether the GNSS circuit module 510 finishes the operation of measuring a positon of the electronic device 101.

According to various embodiments, in operation 919, upon identifying that the GNSS circuit module 510 finishes the position measurement operation, the processor 520 may transmit and/or receive data using the first cellular communication.

According to various embodiments, upon identifying that the GNSS circuit module 510 finishes the position measurement operation, the processor 520 may reactivate the first mmWave communication module 530, and perform the first cellular communication using one or more communication modules among the first mmWave communication module 530, the second mmWave communication module 420, or the third mmWave communication module 430.

An operation method of an electronic device according to various example embodiments may include: receiving, from a GNSS circuit module which receives a signal for measuring a position of the electronic device, a signal indicating a start of position measurement of the electronic device based on a first mmWave communication module, which is disposed adjacent to the GNSS circuit module and is configured to perform a first cellular communication, being activated; determining whether to deactivate the first mmWave communication module based on an operational characteristic of an application activated on a processor; and controlling the first mmWave communication module based on the determining whether to deactivate the first mmWave communication module.

In the operation method of an electronic device according to various example embodiments, the determining of whether to deactivate the first mmWave communication module may include: identifying whether the activated application requests a position of the electronic device; and, based on the identification result, determining whether to deactivate the first mmWave communication module.

In the operation method of an electronic device according to various example embodiments, the determining of whether to deactivate the first mmWave communication module may include: identifying a cycle by which the activated application requests position information of the electronic device, and, based on the request cycle, determining whether to deactivate the first mmWave communication module.

In the operation method of an electronic device according to various example embodiments, the determining of whether to deactivate the first mmWave communication module may include determining whether to deactivate the first mmWave communication module based on the activated application and first mapping data to which the priority with respect to the GNSS circuit module is mapped based on position information request frequency and usage time of the GNSS circuit module for each of applications.

In the operation method of an electronic device according to various example embodiments, the determining of whether to deactivate the first mmWave communication module may further include determining whether to deactivate the first mmWave communication module based on the activated application and second mapping data to which authority information on access to the position information of the electronic device for each of the applications is mapped.

In the operation method of an electronic device according to various example embodiments, the determining of whether to deactivate the first mmWave communication module may include: identifying whether a request signal for requesting position information of the electronic device, transmitted by an external electronic device via a second cellular communication, is received; and, based on whether the request signal is received, determining whether to deactivate the first mmWave communication module.

In the operation method of an electronic device according to various example embodiments, the determining of whether to deactivate the first mmWave communication module may include: identifying information related to data usage via the first cellular communication of an activated application; and determining whether to deactivate the first mmWave communication module, based on the information related to data usage.

In response to identification of deactivation of the first mmWave communication module, an operation method of an electronic device according to various example embodiments may further include activating a second mmWave communication module configured to emit a signal in a direction different from an emitting direction of a signal output from the first mmWave communication module and performing the first cellular communication.

An operation method of an electronic device according to various example embodiments may further include: determining whether to activate a communication module configured to perform a second cellular communication different from the first cellular communication based on quality information of the first cellular communication using the second mmWave communication module; and performing the second cellular communication using the communication module.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. One of ordinary skill in the art will understand and appreciate that various changes in form and detail may be made without departing from the true spirit and full scope of the disclosure, including the appended claims and their equivalents.

What is claimed is:

1. An electronic device comprising:
   a GNSS circuit module comprising GNSS circuitry configured to receive a signal for measuring a position of the electronic device;
   a first mmWave communication module comprising communication circuitry disposed adjacent to the GNSS circuit module and configured to perform a first cellular communication; and
   a processor,
   wherein the processor is configured to: receive, from the GNSS circuit module, a signal indicating a start of position measurement of the electronic device based on the first mmWave communication module being activated;
   in response to receiving the signal indicating the start of position measurement, determine whether to deactivate the first mmWave communication module based on an operational characteristic of an application activated on the processor, wherein the application uses data received using the first mmWave communication module or the measured position of the electronic device using the GNSS circuit module; and
   control the first mmWave communication module based on the determination of whether to deactivate the first mmWave communication module.

2. The electronic device of claim 1, wherein the processor is configured to:
   identify whether the activated application requests a position of the electronic device; and
   determine whether to deactivate the first mmWave communication module based on the identification.

3. The electronic device of claim 1, wherein the processor is configured to:
   identify a cycle by which the activated application requests position information of the electronic device; and
   determine whether to deactivate the first mmWave communication module based on the cycle.

4. The electronic device of claim 1, further comprising a memory configured to store mapping data to which a priority with respect to the GNSS circuit module is mapped based on position information request frequency and usage time of the GNSS circuit module for each application,
   wherein the processor is configured to determine whether to deactivate the first mmWave communication module based on the activated application and the mapping data.

5. The electronic device of claim 4, wherein the mapping data further comprises authority information on access to position information of the electronic device for each of the applications, and
   wherein the processor is configured to determine whether to deactivate the first mmWave communication module based on the activated application and the authority information included in the mapping data.

6. The electronic device of claim 1, comprising a second communication module comprising communication circuitry configured to transmit and/or receive data via a second cellular communication,
   wherein the processor is configured to identify whether a request signal requesting position information of the electronic device, transmitted by an external electronic device via the second cellular communication, is received, and
   to determine whether to deactivate the first mmWave communication module based on determining whether the request signal is received.

7. The electronic device of claim 1, wherein the processor is configured to identify information related to data usage of the activated application via the first cellular communication, and
   to determine whether to deactivate the first mmWave communication module based on the information related to data usage.

8. The electronic device of claim 1, wherein the processor is configured to trace an operation of the GNSS circuit module based on the first mmWave communication module being deactivated, and
   to, based on identifying that position measurement of the GNSS circuit module not being performed, activate the first mmWave communication module.

9. The electronic device of claim 1, further comprising a second mmWave communication module comprising communication circuitry configured to emit a signal in a direction different from an emitting direction of a signal output from the first mmWave communication module, and to perform the first cellular communication,
   wherein the processor is configured to, based on identifying that the first mmWave communication module is deactivated, activate the second mmWave communication module.

10. The electronic device of claim 9, further comprising a second communication module comprising communication circuitry configured to perform a second cellular communication different from the first cellular communication,
    wherein the processor is configured to determine whether to activate the second communication module based on quality information of the first cellular communication using the second mmWave communication module, and,
    to, based on identifying that the second communication module is activated, perform the second cellular communication using the second communication module.

11. The electronic device of claim 1, wherein the processor is configured to change a position measurement cycle of the electronic device of the GNSS circuit module based on a characteristic of the application, and
    to control the first mmWave communication module based on a changed position measurement cycle.

12. An operation method of an electronic device, the operation method comprising:
    receiving, from a GNSS circuit module configured to receive a signal for measuring a position of the electronic device, a signal indicating a start of position measurement of the electronic device based on a first mmWave communication module disposed adjacent to the GNSS circuit module and configured to perform a first cellular communication, being activated;
    in response to receiving the signal indicating the start of position measurement, determining whether to deactivate the first mmWave communication module based on an operational characteristic of an application activated on a processor wherein the application uses data received using the first mmWave communication module or the measured position of the electronic device using the GNSS circuit module; and controlling the first mmWave communication module based on determining whether to deactivate the first mmWave communication module.

13. The operation method of claim 12, wherein the determining of whether to deactivate the first mmWave communication module comprises:

identifying whether the activated application requests a position of the electronic device; and determining whether to deactivate the first mmWave communication module based on the identification.

14. The operation method of claim 12, wherein the determining of whether to deactivate the first mmWave communication module comprises:

identifying a cycle by which the activated application requests position information of the electronic device; and determining whether to deactivate the first mmWave communication module based on the cycle.

15. The operation method of claim 12, wherein the determining of whether to deactivate the first mmWave communication module comprises: determining whether to deactivate the first mmWave communication module based on the activated application and first mapping data to which a priority with respect to the GNSS circuit module is mapped based on position information request frequency and usage time of the GNSS circuit module for each application.

16. The operation method of claim 15, wherein the determining of whether to deactivate the first mmWave communication module further comprises: determining whether to deactivate the first mmWave communication module based on the activated application and second mapping data to which authority information on access to position information of the electronic device for each application is mapped.

17. The operation method of claim 12, wherein the determining of whether to deactivate the first mmWave communication module comprises:

identifying whether a request signal requesting position information of the electronic device, transmitted by an external electronic device via a second cellular communication, is received; and, determining whether to deactivate the first mmWave communication module based on the request signal being received.

18. The operation method of claim 12, wherein the determining of whether to deactivate the first mmWave communication module comprises:

identifying information related to data usage of the activated application via the first cellular communication; and determining whether to deactivate the first mmWave communication module based on the information related to data usage.

19. The operation method of claim 12, further comprising activating a second mmWave communication module configured to emit a signal in a direction different from an emitting direction of a signal output from the first mmWave communication module and performing the first cellular communication in response to identification of deactivation of the first mmWave communication module.

20. The operation method of claim 19, further comprising:

determining whether to activate a communication module configured to perform a second cellular communication different from the first cellular communication based on quality information of the first cellular communication using the second mmWave communication module; and performing the second cellular communication using the communication module.

* * * * *